United States Patent [19]

Walker

[11] Patent Number: 5,688,905

[45] Date of Patent: Nov. 18, 1997

[54] PRIMARY-TERTIARY DIAMINES MIXED WITH POLYAMINES AS EPOXY RESIN HARDENERS

[75] Inventor: Frederick Herbert Walker, Doylestown, Pa.

[73] Assignee: Air Products and Chemicals, Inc., Allentown, Pa.

[21] Appl. No.: 530,813

[22] Filed: Sep. 20, 1995

[51] Int. Cl.$^6$ .......................... C08G 69/34; C08L 63/02; C08L 63/04

[52] U.S. Cl. .................. 528/332; 525/420; 525/420.5; 525/423; 525/504; 525/523; 528/120; 528/335; 528/342

[58] Field of Search .................... 528/120, 332, 528/335, 342; 525/420, 420.5, 423, 504, 523

[56] References Cited

U.S. PATENT DOCUMENTS

| | | | |
|---|---|---|---|
| 3,008,909 | 11/1961 | Ernst | 528/120 |
| 3,947,395 | 3/1976 | Ogata et al. | 527/501 |
| 5,385,990 | 1/1995 | Abbey et al. | 528/120 |

FOREIGN PATENT DOCUMENTS

| | | | |
|---|---|---|---|
| 49-062600 | 6/1974 | Japan . | |
| 61-143419 | 7/1986 | Japan . | |
| 61-143420 | 7/1986 | Japan . | |
| 61-143421 | 7/1986 | Japan . | |
| 63-215716 | 9/1988 | Japan . | |
| 1019925 | 2/1966 | United Kingdom | 528/120 |

OTHER PUBLICATIONS

Chemistry and Technology of Epoxy Resins, Ellis, Blackie Academic & Professional, New York, NY, pp. 40–41, 1993.
Kroupa, J. Chem Prum. (1976), 26(9), 477–80.
C. W. Jennings, J. Adhes. (1972), 4(1), 25–38.

*Primary Examiner*—Robert E. Sellers
*Attorney, Agent, or Firm*—Michael Leach; William F. Marsh

[57] ABSTRACT

An amine hardener composition for curing epoxy resin based coatings and related products comprising (A) from 5 to 75% of a diamine which possesses a vapor pressure less than about 133 Pascals at 20° C., contains both a primary and a tertiary amine and corresponds to either of the structures:

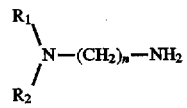

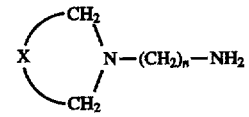

where $R_1$ and $R_2$ are independently $C_1$–$C_8$ alkyl; X is $-CH_2-CH_2-$, $-CH_2-CH_2-CH_2-$, or $-CH_2-O-CH_2-$; and n is 2–6, (B) from 5 to 95% of a polyamide, amidoamine, Mannich base or cycloaliphatic amine curing agent; and (C) from 0 to 50% of other active hydrogen containing diamines or polyamines. Coatings based on the composition can be formulated at up to 100% solids, and have an excellent combination of pot life and dry speed.

18 Claims, No Drawings

PRIMARY-TERTIARY DIAMINES MIXED WITH POLYAMINES AS EPOXY RESIN HARDENERS

TECHNICAL FIELD

The present invention relates to polyamine hardeners for curing epoxy based coating compositions.

BACKGROUND OF THE INVENTION

Coatings based on a combination of epoxy resins and amine hardeners which react to form a crosslinked film have enjoyed widespread use for decades. Because of the combination of properties achievable, they have developed strong market positions in those applications where a high degree of resistance to water, chemical reagents, or corrosive environments is required.

A good introduction to the general chemistry of epoxy resins is available in H. Lee and K. Neville, Handbook of Epoxy Resins (1967 McGraw-Hill Inc.). Commercially available epoxy resins useful in coatings are frequently referred to as either liquid resin or solid resin. The commercially important solid epoxy resins have an epoxy equivalent weight (EEW) greater than about 450. Although much higher EEW epoxy resins are available, the resins employed in amine cured coatings generally have an equivalent weight less than about 1000. At higher equivalent weights the resulting crosslink density is too low to give the desired properties. The commercially important liquid epoxy resins have an EEW of less than about 250, and more frequently less than about 200. Though much slower to dry than solid epoxies, they result in films with very high crosslink densities, and find utility where very chemically resistant coatings are required. Of course, they also require less solvent for application in traditional solvent borne formulations. There is also a class of epoxy resins sometimes referred to as semi-solid resins, with EEWs intermediate between liquid and solid. It should be realized that a reference to "liquid" or "solid" resin may refer not to the actual physical state of the resin, but to the EEW range of the resin, and perhaps to the properties that may be anticipated with its use.

Concerns over environmental pollution and the health risks associated with chemical exposure have resulted in an intense effort by coatings manufacturers and raw material suppliers to develop products that have lower volatile organic content (VOC). One purpose of the solvents in coatings is to allow the normally viscous materials which comprise the coating formulation to be applied in a manner that results in a continuous thin film that will harden or cure with the required appearance and physical properties. As higher solids formulations containing less solvent have been developed, there has been a tendency to adopt lower viscosity epoxy resins (i.e. liquid epoxy resins) and lower viscosity curing agents, both of which are usually of a lower molecular weight than their predecessors. As one consequence, there is a general tendency of high and 100% solids epoxy formulations to dry or become tack free at a much slower rate than low solids epoxy coatings, since many more chemical reactions must take place before the binder reaches the viscosity necessary to feel tack free.

Because the resin components are of much lower molecular weight and there is less solvent present in high solids and 100% solids coatings, it is clear that the concentration of reactive groups in the composition is much higher than it would be in a low solids coating. The rate of reaction of the components will be governed by a rate law, which in the case of an epoxy/amine system, includes the concentration of both of the reactive groups. Thus as the concentrations increase, the rate of reaction increases. Since the reactions increase molecular weight, the viscosity also increases. The net result is that the pot life, in other words the time during which the coating composition is of low enough viscosity to be applied to the substrate, is much shorter for high solids coatings than for low solids coatings of the same type.

Amines used as curing agents for epoxy resins tend to be corrosive and irritating toward the eyes, skin, and respiratory tract. Normally this does not create a major problem for the applicator as long as precautions are taken to avoid contact with the curing agent. However, both viscosity and vapor pressure are dependent on molecular weight and in the attempt to reduce the viscosity of an epoxy/amine coating binder it is possible to reach the point where the amine vapors arising from the coating create a hazard for workers and other people exposed during the application process.

One way to increase the solids level while maintaining acceptable viscosity of an amine cured epoxy formulation is to include a non-reactive plasticizer of low volatility, such as benzyl alcohol, an alkyl phenol, or a phthalate ester, in the formulation. However, these species can have a negative effect on some final performance properties of the coating, such as water resistance, glass transition temperature, and hardness. Also, because they can leach out of the film, especially when the film is immersed in water or an organic solvent, they are sometimes unsuitable for many applications, such as coatings that come in contact with food, potable water, or pharmaceuticals.

Another way to increase the solids level while maintaining acceptable viscosity of an amine cured epoxy formulation is to include an epoxy diluent such as cresyl glycidyl ether or butyl glycidyl ether or the like. This approach also has drawbacks. Dry times are extended and, because the monoglycidyl ethers are chain terminators, mechanical and chemical resistance properties of the cured network are generally reduced. There are also concerns about the toxicity of these materials, and many of them have high levels of bound chloride that make them unsuitable for some purposes.

JP 61143421 discloses the combination of compounds of the following Formulas I and II along with some conventional curing agents and epoxy resins as well as a $BF_3$-amine complex, imidazole, or urea accelerator, for use as the resin matrix for composite materials:

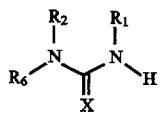

I

II where X is an oxygen atom, sulfur atom, or an $=N-R_5$ group; $R_1$, $R_2$, $R_3$, $R_4$, $R_5$ and $R_6$, which may be the same or different, are hydrogen atoms, $C_1$ to $C_{17}$ saturated or unsaturated aliphatic groups, alicyclic groups, aromatic groups, or heterocyclic groups, or $R_1$, $R_2$, $R_3$, $R_4$, $R_5$, and $R_6$ are heterocyclic residues together with nitrogen atoms bonding with them. Among the extensive laundry list of compounds as corresponding to Formula I are ammonia, methylamine, propylamine, aniline, N-aminopropylmorpholine, and many others whose structures do not correspond to Formula I.

JP 61143420-A and JP 61143419-A (abstracts) appear to be closely related to JP61143421.

JP 63215716 A2 (abstract) discloses a combination of epoxy resins, multifunctional (meth)acrylates, and an amine corresponding to $X_1(CH_2)_nX_2$ where $X_1=NH_2$, 4-piperidinyl; $X_2=NH_2$, $C_{1-5}$ monoalkylamino, 4-piperidinyl, morpholino, and $n=3-9$. Molded products with improved impact resistance are allegedly obtained.

Kroupa, J. et al, Chem. Prum. (1976), 26(9), 477–80, discloses that the hardening time, conversion into gel, and apparent activation energy of an epoxy resin during crosslinking with $H_2N(CH_2)_3NRR^1$ strongly depends on size and mobility of R and $R^1$. Shown are compounds in which R=H, $R^1$=Ph; R=H, $R^1$=iso—Pr; R=H, $R^1$=iso—Bu; R=H, $R^1$=PhCH$_2$; R=H, $R^1$=2-methylbenzyl; R=H, $R^1$=3-aminopropyl; R=$R^1$=Me; R=$R^1$=Et; and R=$R^1$=Bu.

JP 49062600 discloses epoxy resins cured with a mixture of an imidazole derivative (I, R=C8–20 alkyl; n(4) and a propylenediamine derivative $RR^1N(CH_2)_3NH_2$ (II, R=$R^1$=C1–4 alkyl, Ph). Specifically, Epikote 828 resin, 1-(2-aminoethyl)-2-pentadecyl-2-imidazole and N,N-diethyl-1,3-propanediamine were mixed and cured.

C. W. Jennings, J. Adhes. (1972), 4(1 ), 25–38 discloses bisphenol A diglycidyl ether, diethylaminopropylamine, an aromatic amines mixture, a polyamide curing agent, a nylon epoxy, polysiloxane and a silicone adhesive were tested on aluminum and stainless steel joints.

SUMMARY OF THE INVENTION

The present invention provides an amine hardener composition for curing epoxy resin coating compositions comprising (A) 5 to 75 wt. % of a diamine which possesses a vapor pressure less than about 133 Pascals (<~1 torr) at 20° C., contains both a primary amine and a tertiary amine and corresponds to either of the following structures:

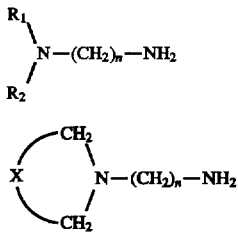

where $R_1$ and $R_2$ are independently $C_1$ to $C_8$ alkyl; X is $-CH_2-CH_2-$, $-CH_2-CH_2-CH_2-$, or $-CH_2-O-CH_2-$; and n is 2–6, (B) 5 to 95 wt. % of an epoxy curing agent which is a polyamide, an amidoamine, a Mannich base or a cycloaliphatic amine; and (C) from 0 to 50 wt. % of other active hydrogen containing di- or polyamines. For the purposes of this specification and the appended claims, the vapor pressure for a compound is that value calculated using the extended Antoine equation.

Another embodiment of the invention is a 90–100% solids, preferably 100% solids, curable epoxy composition comprising the amine hardener composition and an epoxy resin.

Still another embodiment of the invention is a substrate coated with a cured epoxy composition comprising the amine hardener composition and an epoxy resin.

The amine hardener compositions, or curing agents, for epoxy resins can be used without the need to include external plasticizers or epoxy diluents in the formulation and will give an improved balance of cure speed and pot life when used in high solids and 100% solids coatings without significantly increasing the concentration of corrosive amine vapors in the workplace relative to conventional curing agents in widespread use.

DETAILED DISCLOSURE OF THE INVENTION

Component A of the amine hardener composition which is present at 5 to 75 wt. %, preferably 25 to 70 wt. %, is a diamine which possesses a vapor pressure less than about 133 Pa at 20° C., preferably <100 Pa, and most preferably <50 Pa, contains both a primary and tertiary amine and corresponds to either of the structures:

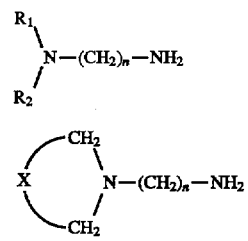

where $R_1$ and $R_2$ are independently $C_1$ to $C_8$ alkyl, preferably $C_1$ to $C_4$, X is $CH_2-CH_2$, $CH_2-CH_2-CH_2$, or $CH_2-O-CH_2$, and n is 2–6, preferably 2–3. Specific examples of suitable diamines include N,N-dibutylethylenediamine, 3-dibutylaminopropylamine, 1-(2-aminoethyl)pyrrolidine, 1-(3-aminopropyl)pyrrolidine, 1-(3-aminopropyl)piperidine, N-aminoethylmorpholine, and N-aminopropylmorpholine. The preferred amine is N-aminopropyl-morpholine.

Component B is used at 5 to 95 wt. %, preferably, 25 to 70 wt. %, and can be a epoxy curing agent which is a polyamide, an amidoamine, a Mannich base, or a cycloaliphatic amine, or a combination of the above. Preferably Component B is an amidoamine or a polyamide, most preferably an amidoamine. All four types have been used in epoxy coatings for a number of years and are well known to those skilled in the art. The polyamides are typically made by condensing a polyalkylene polyamine, especially a polyethylene amine such as diethylenetriamine, triethylenetetramine, tetraethylenepentamine, or pentaethylenehexamine with a dimerized fatty acid, and the amidoamines are made by condensing the same polyethylene amines with a fatty acid. Sometimes mixtures of dimer acids and fatty acids are employed. The polyamides and amidoamines are sometimes further modified, such as for example by adduction with epoxy resin or a glycidyl ether or some other epoxide containing species.

The Mannich bases are condensates of phenol or an alkyl phenol, formaldehyde, and a di- or polyamine, such as the above polyethylene amines.

The cycloaliphatic curing agents are a class of curing agents based on diamines and polyamines containing cycloaliphatic rings. Examples include meta-xylylene diamine, the various isomers of diaminocyclohexane, isophorone diamine, 3,3'-dimethyl-4,4'-diaminodicyclohexyl methane, 4,4'-diaminodicyclohexyl methane, 2,4'-diaminodicyclohexyl methane, and the mixture of methylene bridged poly(cyclohexylaromatic)-amines (MBPCAA) described in U.S. Pat. No. 5,280,091. These cycloaliphatic amines may also be modified in a number of ways, including adduction with epoxy resin or a glycidyl ether or some other epoxide containing species, or by preparing a Mannich base. The cycloaliphatic curing agents may also include plasticizers and accelerators for the amine epoxy reaction.

Component C is optionally present in the amine hardener composition at 0 to 50 wt. %, preferably 5 to 20 wt. %, and includes diamines and polyamines containing three or more active hydrogens. Examples include polyethylene amines (ethylenediamine, diethylenetriamine, triethylenetetramine, pentaethylenehexamine and the like), 1,2-propylenediamine, 1,3-propylenediamine, 1,4-butanediamine, 1,5-pentanediamine, 1,5-hexanediamine, 1,3-pentanediamine, 1,6-hexanediamine, 3,3,5-trimethyl-1,6-hexanediamine, 3,5,5-trimethyl-1,6-hexanediamine, 2-methyl-1,5-pentanediamine, bis-(3-aminopropyl)amine, N,N'-bis-(3-aminopropyl)-1,2-ethanediamine, N-(3-aminopropyl)-1,2-ethanediamine, 1,2-diaminocyclohexane, 1,3-diaminocyclohexane, 1,4-diaminocyclohexane, aminoethylpiperazine, and the poly(alkylene oxide) aliamines and triamines (such as for example Jeffamine D-230, Jeffamine D-400, Jeffamine D-2000, Jeffamine D-4000, Jeffamine T-403, Jeffamine EDR-148, Jeffamine EDR-192, Jeffamine C-346, Jeffamine ED-600, Jeffamine ED-900, and Jeffamine ED-2001). Preferred are the poly(alkylene oxide) aliamines and triamines, most preferably Jeffamine D230.

Hardener compositions according to this invention are useful in applications requiring a relatively thin film of cured epoxy resin, such as coatings, adhesives, and civil engineering applications such as floor coatings. The latter are usually amine and epoxy formulations that are frequently filled with sand, stone, silica, and the like.

Thus the invention also provides coatings (25 to 5000 microns) of cured epoxy compositions comprising the amine hardener and an epoxy resin on substrates such as wood, metal, concrete, plastic and glass.

The hardener compositions can be combined with epoxy resin at a level of 0.5 to 1.5 of the "normal" use level, and preferably from 0.85 to 1.15 of the normal use level. For any component, the "normal" use level is usually the amount required to achieve a stoichiometric balance of epoxy groups and amine hydrogens in the formulation. It can be calculated in parts per hundred resin (phr) using the following equation:

$$\frac{100 \cdot AHEW}{EEW}$$

where AHEW is the amine hydrogen equivalent weight of the amine, and EEW is the epoxy equivalent weight of the epoxy resins. Some curing agents, however, such as amidoamines and polyamides, have poorly defined amine hydrogen contents. Instead, a use level is given as a general guide for formulating with standard bisphenol A epoxy, which is the amount expressed as phr which has been found empirically to give generally optimum properties.

For a curing agent composed of a mixture of amines, as in the present case, the use level is the sum of the weight fraction of the individual components (W) of the curing agent times their use levels (L):

Use Level=Wa●La+Wb●Lb+...

The hardener composition is combined with an epoxy resin which is a polyepoxy compound containing about 2 or more 1,2-epoxy groups per molecule. Such epoxides are described in Y. Tanaka, "Synthesis and Characteristics of Epoxides", in C. A. May, ed., *Epoxy Resins Chemistry and Technology* (Marcel Dekker 1988). Examples include epoxides of polyunsaturated organic compounds, oligomers of epihalohydrins, glycidyl derivatives of hydantoin and hydantoin derivatives, glycidyl ethers of polyvalent alcohols, glycidyl derivatives of triazines, and glycidyl ethers of dihydric phenols. Epoxides of polyunsaturated organic compounds include divinyl benzene, cyclohexadiene, cyclooctadiene, dicyclopentadiene, cyclododecadiene, cyclododecatriene, isoprene, 1,5-hexadiene, butadiene, polybutadiene, polyisoprene, and the like. Glycidyl ethers of polyvalent alcohols include glycidyl ethers of neopentyl, ethylene, propylene, and butylene glycol, trimethylolpropane, 2-ethyl-1,3-hexanediol, 2,2-diethyl-1,3-propanediol, 2-butyl-2-ethyl-1,3-propanediol, 1,6-hexanediol, 1,4-butanediol, 1,3-propanediol, 1,5-pentanediol, 1,8-octanediol, 1,10-decanediol, 1,12-dodecanediol, 1,2-cyclohexanediol, 1,4-cyclohexanediol, 1,4-cyclohexane dimethanol, glycerin, sorbitol, pentaerythritol, and the like. Glycidyl ethers of polymeric polyvalent alcohols are also suitable and include the glycidyl ethers of polyethylene glycol, polypropylene glycol, polybutylene glycol, the various copolymers of ethylene, propylene, and butylene oxide, polyvinyl alcohol, polyallyl alcohol, and the like. The glycidyl derivatives include triglycidyl isocyanurate.

The glycidyl derivatives of hydantoin and hydantoin derivatives include structures shown below where R1 and R2 are alkyl chains of 1 to 4 carbons, or R1 and R2 represent a single tetramethylene or pentamethylene chain.

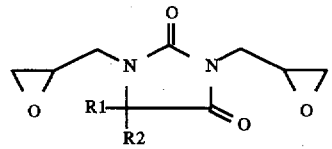

Glycidyl ethers of polyhydric phenols include the glycidyl ethers of dihydric phenols, including resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (more commonly known as hisphenol A), and bis-(4-hydroxyphenyl)-methane (more commonly known as bisphenol F, and which may contain varying amounts of 2-hydroxyphenyl isomers), and the like. Also useful are the advanced dihydric phenols of the following structure:

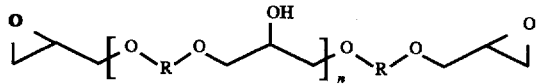

where n is an integer, and R is a divalent hydrocarbon radical of a dihydric phenol, such as the dihydric phenols listed above. Such materials are prepared by polymerizing mixtures of the dihydric phenol and epichlorohydrin, or by advancing a mixture of the diglycidyl ether of the dihydric phenol and the dihydric phenol. While in any given molecule the value of n is an integer, the materials are invariably mixtures which can be characterized by an average value of n which is not necessarily a whole number. Useful in this invention are polymers with an average value of n between 0 and about 7, preferably between 0 and 3. Also useful in this invention are the epoxy novolac resins, which are the glycidyl ethers of novolac resins. Novolac resins are the reaction product of a mono or dialdehyde, most usually formaldehyde, with a mono or polyphenolic material. Examples of monophenolic materials which may be utilized include phenol, the cresols, p-tert-butylphenol, nonylphenol, octylphenol, other alkyl and phenyl substituted phenols, and the like. Polyphenolic materials include the various diphenols including bisphenol-A and the like. Aldehydes which are utilized for the novolac include formaldehyde, glyoxal, and the higher aldehydes up to about C4. The novolacs typically are complex mixtures with different degrees of hydroxyl functionality. For the purposes of this invention useful functionalities range from about 2 to about 4.

The preferred polyepoxy compounds are the diglycidyl ethers of bisphenol-A, the advanced diglycidyl ethers of bisphenol-A, the diglycidyl ethers of bisphenol-F, and the epoxy novolac resins. Particularly preferred is the diglycidyl ether of bisphenol-A.

Although the amine hardeners of this invention allow the formulation of very high or even 100% solids systems without the need to incorporate monofunctional epoxy diluents, the resin may be modified with a portion of monofunctional epoxide. In this way viscosity is further reduced, which may be advantageous in certain cases, such as for example to increase the level of pigment in a formulation while still allowing easy application, or to allow the use of a higher molecular weight epoxy resin. Examples of useful monoepoxides include styrene oxide, cyclohexene oxide, ethylene oxide, propylene oxide, butylene oxide, and the glycidyl ethers of phenol, the cresols, tert-butylphenol and other alkyl phenols, butanol, 2-ethylhexanol and the like.

Normally, coating compositions according to the present invention will consist of at least two components, one of which contains the epoxy resin, and the other the hardener, or curing agent. It will sometimes be advantageous to include one or more organic solvents in one or both components of the coating. The solvents are employed to, for example, reduce the viscosity of the individual or combined components, to reduce the surface tension of the formulation, to aid in film formation, and to increase pot life. Useful solvents are the lower molecular weight glycol ethers such as ethylene glycol monopropyl ether, ethylene glycol monobutyl ether, ethylene glycol monoethyl ether, propylene glycol monomethyl ether, propylene glycol monoethyl ether, diethylene glycol monobutyl ether, and the like, the aromatic solvents such as toluene and xylene and aromatic solvent blends such as Aromatic 100 solvent, ketones such as methyl ethyl ketone, methyl isobutyl ketone, and methyl amyl ketone, esters such as butyl acetate, and alcohols such as isopropyl alcohol, butanol, and 2-ethylhexanol. If ester solvents are employed, they should normally be incorporated in the epoxy side of the formulation to prevent reaction with the curing agent during storage.

It may also be advantageous to include plasticizers such as benzyl alcohol, phenol, tert-butylphenol, nonylphenol, octylphenol, dibutyl phthalate, benzyl 2-ethylhexyl phthalate, butyl benzyl phthalate, 2-ethylhexyl diphenyl phosphate, isodecyl diphenyl phosphate and the like in one or both of the components. With the phosphate and phthalate esters it will usually be advantageous to include them with the epoxy component in order to avoid reaction with the hardener during storage. Plasticizers reduce the glass transition temperature of the composition and therefore allow the amine and epoxide to achieve a higher degree of reaction than might otherwise be possible. Their use is particularly advantageous in combination with cycloaliphatic curing agents.

Accelerators for the epoxy amine reaction may be employed in the formulation. Useful accelerators are well known to those skilled in the art and include acids such as salicylic acid, various phenols, various carboxylic acids, various sulfonic acids, and tertiary amines such as tris-(dimethylaminomethyl)-phenol which is the preferred accelerator.

The coating formulation may also include pigments and mixtures of pigments. The pigments may be ground into the epoxy resin, the hardener, or both. They may also be incorporated with the use of a pigment grinding aid or pigment dispersant, which may be used in combination with the epoxy resin or the hardener, or may be used alone. The use of pigment dispersants is well known to those skilled in the art of coating formulation.

Other additives may also be included in the coatings formulation. Such additives include defoamers, surfactants, slip and mar aids, rheology modifiers, flow aids, adhesion promoters, light and heat stabilizers, corrosion inhibitors, and the like.

EXAMPLES 1–14

The coatings of Tables 1 and 2 were prepared by hand mixing the ingredients indicated. After allowing the mixtures to induct for 15 min, the clear films were applied to polished 7.6×15.2 cm cold rolled steel panels (Q Panel Co.) and to 7.6×15.2 cm grit blasted hot rolled steel with a 2 mil profile (Custom Lab Specialties Co.). Thin film set times were measured at the indicated temperatures using a B-K recorder (Paul N. Gardner Co.) and taken as the time at which the needle was lifted off the surface of the glass substrate. Gel times were measured on 150 g total mass of epoxy resin and curing agents using a Tecam gelation timer model GT-4 (Paul N. Gardner Co.) which operates at 10 strokes per minute.

TABLE 1

| Example | 1 | 2 | 3 | 4 | 5 | 6 | 7 | 8 | 9 | 10 |
|---|---|---|---|---|---|---|---|---|---|---|
| Hardener Comp | | | | | | | | | | |
| % APM[1] | | 35 | | 55 | 60 | 11.88 | 39.38 | 43 | | |
| % Jeffamine D230[2] | 35 | | 55 | | | 39.38 | 11.88 | 12 | | |
| % Ancamide 2426[3] | 60 | 60 | 40 | 40 | 40 | 45 | 45 | 40 | 100 | 95 |
| % Ancamine K54[4] | 5 | 5 | 5 | 5 | | 3.75 | 3.75 | 5 | | 5 |
| Hardener(g) | 55.3 | 47.1 | 57 | 44.4 | 42 | 52.7 | 46.6 | 46.6 | 49 | 51.6 |
| Epoxy Resin[5](g) | 100 | 100 | 100 | 100 | 100 | 100 | 100 | 100 | 100 | 100 |
| Mix Viscosity (cP) | 986 | 998 | 531 | 550 | 535 | 541 | 602 | 501 | 3428 | 3821 |
| TFST @ 16° C. (Hr.) | 26 | 18.25 | 24.5 | 14.5 | 18 | 24.25 | 18.5 | 13.75 | | |
| TFST @ 25° C. (Hr.) | | | | | | | | | 14 | 11.75 |
| Gel Time(Min.) | 377 | 209 | 433 | 165 | 207 | 371 | 232 | 240 | 292 | 193 |
| Peak Exotherm (°C.) | 34 | 72 | 39 | 84 | 96 | 36 | 57 | 92 | 34 | 36 |

TABLE 1-continued

| Example | 1 | 2 | 3 | 4 | 5 | 6 | 7 | 8 | 9 | 10 |
|---|---|---|---|---|---|---|---|---|---|---|

[1]N-aminopropylmorpholine.
[2]Amine terminated polypropylene oxide, mol Wt. = 230, Huntsman Corp.
[3]Amidoamine curing agent, recommended use level 49 phr, Air Products and Chemicals Inc.
[4]Tertiary amine catalyst (tris-(dimethylaminomethyl)-phenol), Air Products and Chemicals, Inc.
[5]Epon 828, EEW = 190, Shell Chemical Co.

The results of Examples 4 and 5 compared to Examples 9 and 10 indicate that by combining an amidoamine curing agent with a primary-tertiary diamine of the current invention, formulations with epoxy resin were obtained that had an excellent balance of low viscosity, fast cure speed and long gel time compared to the use of an amidoamine curing agent without the primary-tertiary diamine. As the level of primary-tertiary diamine was increased, dry time and viscosity were both reduced. Dry time was enhanced with the addition of a tertiary amine catalyst, while still maintaining a long gel time. The dry speeds were much faster than were obtained using an alternative, tetrafunctional diamine curing agent (Jeffamine D230, Examples 1 and 3). However, by combining small amounts of Jeffamine D230 (Example 8), a further improvement in gel time was achieved, while maintaining a fast thin film set time. In this way the flow and appearance properties of the coating were also enhanced.

TABLE 2

| Experiment | 11 | 12 | 13 | 14 |
|---|---|---|---|---|
| Hardener Comp | | | | |
| % APM[1] | 71.25 | 47.5 | 23.75 | 0 |
| % Anc. 350A[2] | 23.75 | 47.5 | 71.25 | 100 |
| % Ancamine K54[3] | 4.75 | 4.75 | 4.75 | 4.75 |
| Hardener (g) | 43.8 | 47.6 | 51.5 | 55.4 |
| Epoxy Resin[4] (g) | 100 | 100 | 100 | 100 |
| Mix Viscosity (cP) | 682 | 1781 | 4663 | 14340 |
| TFST @ 25° C. (Hr.) | 7.75 | 7.5 | 7.75 | 6 |
| Gel Time (Min.) | 145 | 193 | 225 | 170 |
| Peak Exotherm (°C.) | 129 | 67 | 56 | 45 |

[1]N-aminopropylmorpholine.
[2]Polyamide curing agent, use level 52.6 phr, Air Products and Chemicals Inc.
[3]Tertiary amine catalyst (tris-(dimethylaminomethyl)-phenol), Air Products and Chemicals, Inc.
[4]Epon 828, EEW = 190, Shell Chemical Co.

Examples 11–14 show that incorporation of APM greatly reduced the mix viscosity of a polyamide and epoxy resin mixture. At levels of 25% and 50% APM. gel time was extended with only a modest increase in thin film set time.

TABLE 3

| Primary-Tertiary Amine | Formula | Calculated Vapor Pressure 20° C. (Pascals) | Literature Vapor Pressure 20° C. (Pascals) |
|---|---|---|---|
| N,N-Diethylethylenediamine | C6H16N2 | 543 | |
| 3-Diethylaminopropylamine | C7H18N2 | 182 | |
| 3-Dimethylaminopropylamine | C5H14N2 | 942 | 665[A] |
| N,N-Dibutylethylenediamine | C10H24N2 | 6.81 | |
| 3-Dibutylaminopropylamine | C11H26N2 | 2.33 | |
| 1-(2-Aminoethyl)pyrrolidine | C6H14N2 | 256 | |
| 1-(3-Aminopropyl)pyrrolidine | C7H16N2 | 106 | |
| 1-(2-Aminoethyl)piperidine | C7H16N2 | 67.6 | |
| 1-(3-Aminopropyl)piperidine | C8H18N2 | 24.6 | |
| N-Aminoethylmorpholine | C6H14N2O | 45.6 | |
| N-Aminopropylmorpholine | C6H16N2O | 24.2 | 7.98[B] |

[A]Lenga, R. E., et al, "The Sigma-Aldrich Library of Regulatory and Safety Data", Vol 1, p 327.
[B]Material Safety Data Sheet for Aminopropylmorpholine, Huntsman Corp., 1 July 1994.

Table 3 gives the calculated values of the vapor pressure in Pascals at 20° C. for a number of primary-tertiary diamines, and compares them to the literature values where available. The vapor pressure calculations were based on the extended Antoine equation [1,2] and were carried out inside Apsen Plus simulation software. When the parameters for this equation were unavailable, as for some of the compounds, an estimation was used. Riedel [3,4] correlated the vapor pressure behavior of pure components to their corresponding critical temperatures, critical pressures, and normal boiling temperatures. Based on this relationship, the Aspen Plus software predicted vapor pressure-temperature curves that can be regressed to yield parameters for the extended Antoine equation.

[1] Antoine, C., *C.R.*, Vol 107, 681,836 (1888)

[2] Harlacher and Braun, *Ind. Eng. Chem. Process Des. Dev.*, Vol 9, 479 (1970)

[3] Reidel, L.; *Chem. Eng. Tech.*, Vol 26, p. 83 (1954).

[4] Reid, R. C., Prausnitz, J. M., Poling, B. E., Eds. *The Properties of Gases and Liquids*, 3rd Edition, McGraw-Hill, 1977, pp 186–187.

STATEMENT OF INDUSTRIAL APPLICATION

The present invention provides amine hardener compositions for curing epoxy resin systems.

I claim:

1. An amine hardener composition for curing epoxy resin based coatings comprising (A) 5 to 75 wt. % of a diamine which possesses a vapor pressure less than about 133 Pascals at 20° C., contains both a primary amine and a tertiary amine and corresponds to either of the structures I and II:

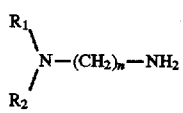

-continued

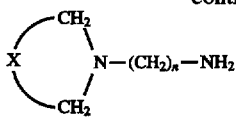   II where $R_1$ and $R_2$ are independently $C_1$–$C_8$ alkyl; X is —$CH_2$—$CH_2$—, —$CH_2$—$CH_2$—$CH_2$—, or —$CH_2$—O—$CH_2$—; and n is 2–6, (B) 25 to 70 wt. % of an amidoamine curing agent; and (C) 5 to 50 wt. % of a poly(alkylene oxide) diamine or triamine containing three or more active hydrogens.

2. The amine hardener composition of claim 1 in which component A is a compound which corresponds to structure II.

3. The amine hardener composition of claim 1 in which component A is selected from the group consisting of N,N-dibutylethylenediamine, 3-dibutylaminopropylamine, 1-(2-aminoethyl)pyrrolidine, 1-(3-aminopropyl)pyrrolidine, 1-(3-aminopropyl)piperidine, N-amino-ethylmorpholine, and N-aminopropylmorpholine.

4. The amine hardener composition of claim 1 in which component A is N-aminopropylmorpholine.

5. The amine hardener composition of claim 1 in which component C is present at 5 to 20 wt. %.

6. The amine hardener composition of claim 1 in which $R_1$ and $R_2$ are independently $C_1$–$C_4$ alkyl.

7. The amine hardener composition of claim 1 in which n=2–3.

8. The amine hardener composition of claim 1 in which component A has vapor pressure <~100 Pascals at 20° C.

9. An amine hardener composition for curing epoxy resin based coatings comprising (A) 25 to 70 wt. % of a diamine which possesses a vapor pressure less than about 100 Pascals at 20° C., contains both a primary amine and a tertiary amine and corresponds to either of the structures I and II:

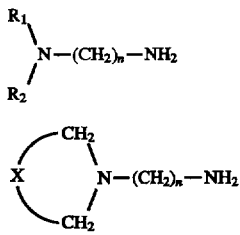

where $R_1$ and $R_2$ are independently $C_1$–$C_4$ alkyl; X is —$CH_2$—$CH_2$—, —$CH_2$—$CH_2$—$CH_2$—, or —$CH_2$—O—$CH_2$—; and n is 2–6, (B) 25 to 70 wt. % of an amidoamine curing agent; and (C) 5 to 50 wt. % of a poly(alkylene oxide) diamine or triamine containing three or more active hydrogens.

10. The amine hardener composition of claim 9 in which component A is a compound which corresponds to structure II.

11. The amine hardener composition of claim 9 in which component A is selected from the group consisting of N,N-dibutylethylenediamine, 3-dibutylaminopropylamine, 1-(2-aminoethyl)pyrrolidine, 1-(3-aminopropyl)pyrrolidine, 1-(3-aminopropyl)piperidine, N-amino-ethylmorpholine, and N-aminopropylmorpholine.

12. The amine hardener composition of claim 9 in which component A is N-aminopropylmorpholine.

13. The amine hardener composition of claim 9 in which component C is present at 5 to 20 wt. %.

14. The amine hardener composition of claim 9 in which n=2–3.

15. The amine hardener composition of claim 9 in which component A has vapor pressure <~50 Pascals at 20° C.

16. An amine hardener composition for curing epoxy resin based coatings comprising (A) 25 to 70 wt. % of a diamine which possesses a vapor pressure less than about 50 Pascals at 20° C., contains both a primary amine and a tertiary amine and corresponds to structure II:

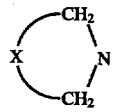

where X is —$CH_2$—$CH_2$—, —$CH_2$—$CH_2$—$CH_2$—, or —$CH_2$—O—$CH_2$—; and n is 2 or 3, (B) 25 to 70 wt. % of an amidoamine curing agent; and (C) 5 to 20 wt. % of a poly(alkylene oxide) diamine or triamine containing three or more active hydrogens.

17. The amine hardener composition of claim 16 in which component (A) is N-aminopropylmorpholine.

18. The amine hardener composition of claim 16 in which component (C) is a poly(propylene oxide) diamine.

* * * * *

UNITED STATES PATENT AND TRADEMARK OFFICE
CERTIFICATE OF CORRECTION

PATENT NO. : 5,688,905
DATED : 18 November 1997
INVENTOR(S) : Frederick Herbert Walker It is certified that error appears in the above-identified patent and that said Letters Patent is hereby corrected as shown below:

In Column 12, Claim 16, the structure was printed incorrectly. It should appear as follows:

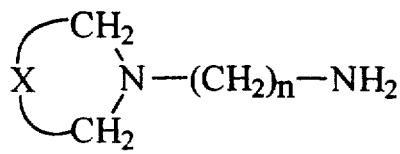

Signed and Sealed this

Third Day of February, 1998

Attest:

BRUCE LEHMAN

Attesting Officer

Commissioner of Patents and Trademarks